United States Patent
Appa

(10) Patent No.: US 6,278,197 B1
(45) Date of Patent: Aug. 21, 2001

(54) CONTRA-ROTATING WIND TURBINE SYSTEM

(76) Inventor: Kari Appa, 22242 Anthony Dr., Lake Forest, CA (US) 92630-2327

(*) Notice: Subject to any disclaimer, the term of this patent is extended or adjusted under 35 U.S.C. 154(b) by 0 days.

(21) Appl. No.: 09/498,769

(22) Filed: Feb. 5, 2000

(51) Int. Cl.[7] ............................... F03D 9/00; H02D 9/04
(52) U.S. Cl. ............................................. 290/55; 290/54
(58) Field of Search ................................. 290/43, 44, 54, 290/55

(56) References Cited

U.S. PATENT DOCUMENTS

| | | | |
|---|---|---|---|
| 4,061,926 | * 12/1977 | Peed | 290/55 |
| 4,648,801 | 3/1987 | Wilson | 416/171 |
| 4,976,587 | 12/1990 | Johnston et al. | 416/230 |
| 5,419,683 | 5/1995 | Peace | 416/227 A |
| 5,456,579 | 10/1995 | Olson | 416/23 |
| 5,506,453 | * 4/1996 | McCombs | 290/44 |
| 6,127,739 | * 10/2000 | Appa | 290/55 |
| 6,172,429 | * 1/2001 | Russell | 290/54 |
| 6,215,199 | * 3/2001 | Lysenko et al. | 290/44 |

* cited by examiner

Primary Examiner—Nicholas Ponomarenko
(74) Attorney, Agent, or Firm—Albert W. Hilburger

(57) ABSTRACT

Wind turbine apparatus includes an upright mast with support bearings underlying and rotatably supporting a hub assembly having inner and outer coaxial shafts telescopically related but radially spaced to permit independent rotation about a generally horizontal axis. An armature winding is provided on the outer shaft and a plurality of dielectrically separated magnets are mounted on the inner shaft at a plurality of circumferentially spaced locations. A first set of rotor blades is mounted on the inner shaft at a plurality of circumferentially spaced locations, the rotor blades extending radially away from the axis of rotation and positioned on the inner shaft for rotating the inner shaft in a first direction about the axis of rotation when subjected to wind-induced air flow. A second set of rotor blades is similarly mounted on the outer shaft axially spaced from the first set of rotor blades for rotating the outer shaft about the axis of rotation in an opposite direction. The hub assembly may be selectively positioned in azimuth so that the first set of rotor blades is relatively closer to the wind-induced air flow, or windward, and the second set of rotor blades is relatively farther from the wind-induced air flow, or leeward. Electrical power is generated as the armature winding on the outer shaft and the plurality of magnets on the inner shaft rotate in opposite directions and power transfer apparatus is provided for drawing off the electrical power from the hub assembly to a distant receiver.

17 Claims, 5 Drawing Sheets

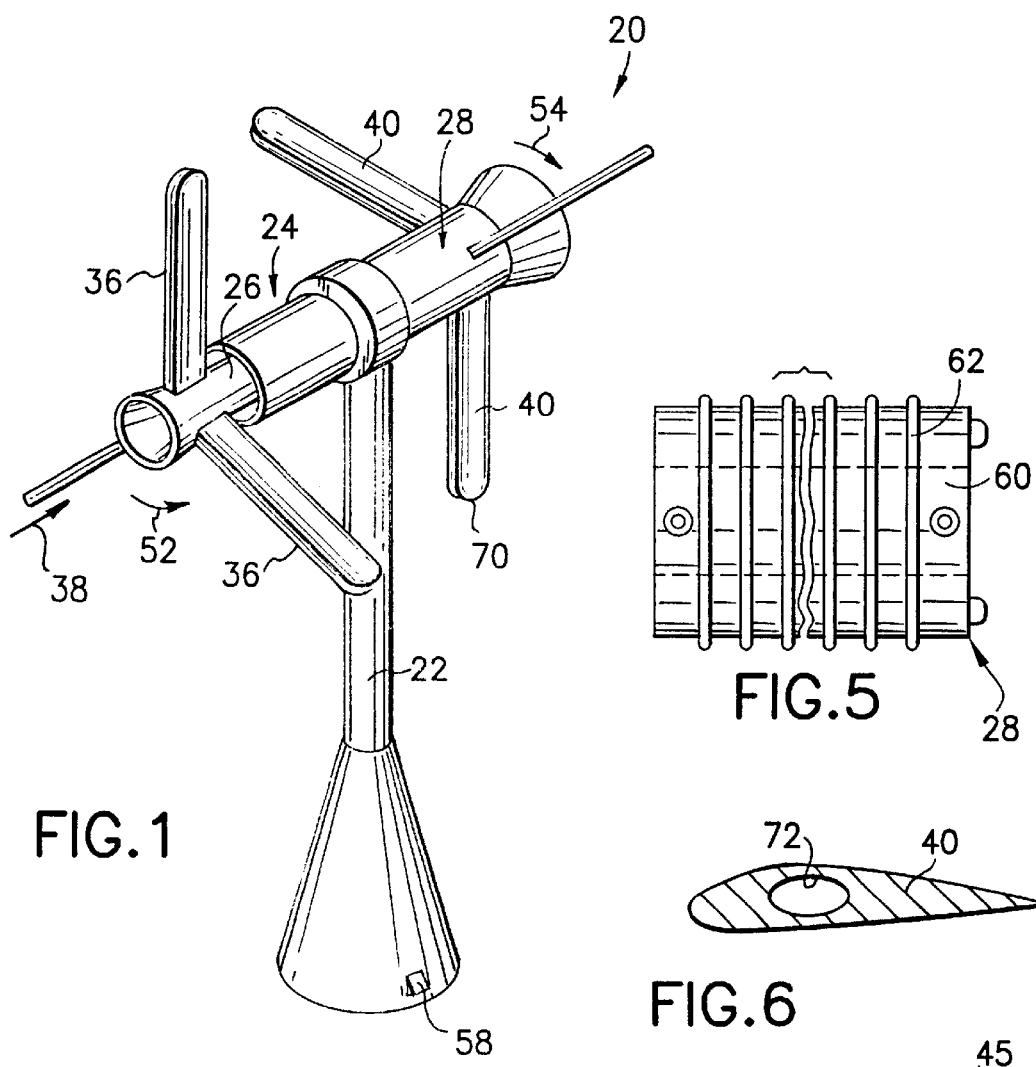
FIG.1
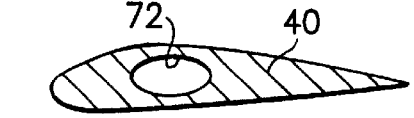
FIG.5
FIG.6
FIG.4A
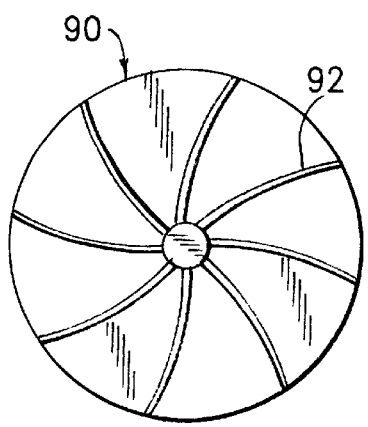
FIG.7
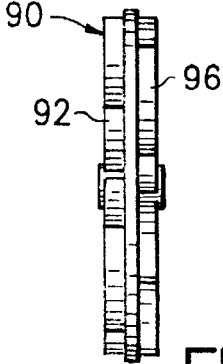
FIG.8

CONTRA-ROTATING WIND TURBINE SYSTEM

BACKGROUND OF THE INVENTION

1. Field of the Invention

The present invention relates generally to a wind energy conversion system and, more particularly, to the design and manufacture of a jet assisted contra-rotating wind turbine system.

2. Prior Art

In recent years, it has become apparent that conventional methods of generating electricity will soon be insufficient to meet the world's ever-growing need for electric power. Several factors, including the pollution which results from the combustion of fossil fuels, the dangers associated with the operation of nuclear reactors, and the limitations inherent in the traditional hydroelectric as well as the more modern solar energy approaches to the generation of electricity, have encouraged the development of alternative sources of electric power, such as the wind turbine generator.

In recent years, wind energy projects have included the installation of large numbers of wind turbine generating systems at locations having favorable wind conditions. Several of these so-called "wind farms" have been located in the state of California. However, during the 1980s, it became apparent that the various wind energy projects using wind turbines to generate electrical energy suffered from a major problem in that the turbines were not receiving the amount of wind energy that was projected based on the initial wind studies that were conducted. Many reasons have been advanced for this shortfall of wind energy. Little can be done about the wind itself, with the exception of understanding the available resource better by using direct measurement and analysis. However, a new rotor blade system according to the present invention, designed to take better advantage of the available wind resource, provides an opportunity for a significant energy increase.

As noted, then, wind turbines are renewable energy devices that are currently useful but not able to optimally extract energy from the wind. According to Albert Betz, a German engineer, pioneer in optimizing wind energy utilization, and author in 1926 of "Wind Energie und Ausnutzung durch Windmuehlen", an ideal rotor disk can deliver to a selected task 59% of the total wind energy generated. For example, an ideal rotor disk is expected to yield 797 watts per square meter at 13 m/sec of wind speed. In contrast, a practical wind turbine, according to Paul Gipe, a more recent well known promoter of wind energy technology in the United States, author of many books on the subject, his most recent contribution being "Wind Energy Comes of Age", John Wiley & Sons, Inc., New York, 1995, can only deliver less than 20% of the available power which is about 100 to 250 watts/m$^2$. Even the most acclaimed Bergey's BWC EXCEL wind turbine yields only 260 watts/m$^2$. Michael Bergey is a small wind turbine manufacturer in the United States whose BWC EXCEL model is generally considered to be the most efficient wind turbine machine in the United States. The reason for such a significantly low energy conversion efficiency may be attributed to the downstream velocity ($V_2$) being greater than one half of the upstream velocity ($V_1$). Thus, a wind turbine comprising of a single rotor system cannot possibly extract the amount of power suggested by Betz. Consequently, more than 60% of the usable energy is swept away in the downstream wind. Another drawback of a single rotor system is that it experiences a large power loss resulting from drag associated with high tip speed of large diameter rotor. Then too, single rotor renewable energy devices are limited in their use since a high torque is necessary to self start the system and therefore can be installed only in regions with consistently high wind speeds.

A small number of patents are typical of the known prior art attempting to improve on earlier efforts to harness wind energy. For example, U.S. Pat. No. 5,456,579 to Olson discloses a wind turbine blade with a governor to maintain optimum rotational speed. The governor positions an aileron for varying wind speed and includes a lead weight positioned at the wing tip and connected to a mechanism that deploys the aileron to achieve the maximum lift to drag ratio at all wind speeds. U.S. Pat. No. 5,419,683 to Peace discloses a method of installing a plurality of wind turbines on chimneys, towers or the like. Two rotors having their horizontal axes are mounted back to back on a ring that turns about the chimney. The primary concept of this invention is to utilize existing structures to mount a plurality of wind turbines and to eliminate the need for wind farms. U.S. Pat. No. 4,976,587 to Johnston et al. discloses a method for manufacturing composite blades having highly improved aerodynamic efficiency. The blades employ the NASA airfoil section LS(1)-04XX having 29 per cent thickness at 3/10 radius and 18 per cent at the blade tip. The airfoil section comprises two spars which terminate into a circular section at the hub. U.S. Pat. No. 4,648,801 to Wilson discloses a method of compressing air by means of a wind turbine. The air is drawn from the low energy region of the downwind stream. The compressed air is connected to the intake of a prime mover (such as a diesel engine, a gasoline engine, or a gas turbine) to boost its output power and drives an alternator.

It was with knowledge of the foregoing state of the technology that the present invention has been conceived and is now reduced to practice.

SUMMARY OF THE INVENTION

The present invention relates to wind turbine apparatus which includes an upright mast with support bearings underlying and rotatably supporting a hub assembly having inner and outer coaxial shafts telescopically related but radially spaced to permit independent rotation about a generally horizontal axis. An armature winding is provided on the outer shaft and a plurality of dielectrically separated magnets are mounted on the inner shaft at a plurality of circumferentially spaced locations. A first set of rotor blades is mounted on the inner shaft at a plurality of circumferentially spaced locations, the rotor blades extending radially away from the axis of rotation and positioned on the inner shaft for rotating the inner shaft in a first direction about the axis of rotation when subjected to wind-induced air flow. A second set of rotor blades is similarly mounted on the outer shaft axially spaced from the first set of rotor blades for rotating the outer shaft about the axis of rotation in an opposite direction. The hub assembly may be selectively positioned in azimuth so that the first set of rotor blades is relatively closer to the wind-induced air flow, or windward, and the second set of rotor blades is relatively farther from the wind-induced air flow, or leeward. Electrical power is generated as the armature winding on the outer shaft and the plurality of magnets on the inner shaft rotate in opposite directions and power transfer apparatus is provided for drawing off the electrical power from the hub assembly to a distant receiver.

To circumvent the deficiencies of a single rotor turbine, a jet assisted, contra-rotating wind turbine system is proposed to extract almost twice the amount of wind power at half the cost of known devices. The proposed wind turbine system involves three distinct innovations. In a first instance, the turbine design of the invention comprises a pair of rotors directly mounted on a pair of co-axial shafts having airfoil shaped bearing supports. The turbine rotors are set to rotate in opposite directions. The co-axial shafts play the dual role of an alternator as well as a torque-transmitting device. The outer surface of the inner shaft is imbedded with permanent magnets, while the inner surface of the outer shaft is wound with armature coils. Thus, the dual-use direct drive concept reduces the weight and cost of the turbine unit. More importantly, a twin rotor system extracts a substantially increased amount of power from the wind. It also provides increased relative speed in the magnetic field that improves electrical performance and results in alternators of reduced weight and reduced cost.

In a second instance, disk theory assumes uniform flow through the rotor, while blade theory suggests that the tip section of the rotor blade is more effective than the root- For the benefit of the reader, Albert Betz used change of momentum of wind energy across the spinning rotor to compute thrust on the rotor blades, an approach known as "disk theory". "Blade theory" uses wind tunnel measured lift, drag and pitching moment coefficients along the span of the blade to compute thrust and torque on the rotor blades. In other words, the kinetic energy of the air mass that surrounds the hub is simply swept away in the downstream flow of air. This may be the main reason why practical wind turbines could not achieve the power density projected by the disk theory. In addition, at full load conditions, an alternator generates heat due to iron and copper losses ($I^2R$). For a typical alternator, this loss amounts to about 10 to 15% of the input power. Therefore, the present invention proposes the construction of a wind turbine which converts the kinetic energy of wind-driven air flow and the thermal energy of the alternator into electrical energy. As wind-driven air flows through a hub assembly past a set of windward turbine blades toward a set of leeward turbine blades, the air passes through an air gap surrounding the alternator. While passing through the air gap surrounding the alternator, heat is extracted from the alternator and cools the armature. Finally, the hot air is directed through a radial passage extending the length of each of the leeward rotor blades and exits tangentially at the blade tips to assist the rotor in developing additional torque. Thus, the kinetic energy of the air mass that surrounds the hub and the thermal energy of the alternator are transformed into electrical energy.

As discussed above, the two-rotor wind turbine system of the invention extracts more energy from the wind than a single rotor system. Consequently, a low energy region is created behind the second rotor. This is called the wake and causes air blockage. This air blockage impairs the aerodynamic performance of the rotor blades. To avoid this situation, a turbofan having double-sided impeller is employed. This turbofan is driven by the generated armature current and pumps a certain mass of air that passes through the leeward rotor blades and exits as countervailing jets at the tip of each blade. Although, a certain amount of energy is used to pump the air through the rotor blades, the removal of air blockage enhances the aerodynamic performance of the blades. Indeed, the excess energy produced by means of improved performance outweighs the energy consumed by the turbofan.

A primary feature, then, of the present invention is the provision of an improved wind energy conversion system.

Another feature of the present invention is the provision of such a wind energy conversion system which employs jet assisted contra-rotating rotor blades.

Still another feature of the present invention is the provision of such a wind energy conversion system which employs two rotors turning in opposite directions, the rotors being mounted coaxially and assuming the dual role of a torque transmitting device as well as an alternator. This concept increases the relative magnetic flux rate at lower rotor speed and almost doubles the energy conversion efficiency compared to a large diameter single rotor system.

Yet another feature of the present invention is the provision of such a system which recovers the thermal energy generated as iron and copper losses and also the kinetic energy of air that surrounds the hub region. Certain amount of air is drawn through an inlet to cool the alternator. The hot air finally passes through the leeward rotor blades and exits at the blade tips as countervailing jets imparting additional torque.

Still a further feature of the present invention is the provision of such a system which improves the aerodynamic efficiency of rotor blades by removing the air blockage behind the leeward rotor and re-directing it through radial passages extending the length of each of the leeward rotor blades and exiting tangentially at the blade tips to assist the rotor in developing additional torque.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

The foregoing aspects and other features of the present invention are explained in the following description, taken in connection with the accompanying drawings, wherein:

FIG. 1 is a perspective view of a wind turbine system embodying the present invention;

FIG. 4A is a cross section view taken generally along line 4A—4A in FIG. 2;

FIG. 5 is a detail side elevation view of components within the hub assembly of the invention;

FIG. 6 is a cross section view taken generally along line 6—6 in FIG. 2;

FIG. 7 is a detail end elevation view of a fan employed by the invention;

FIG. 8 is a side elevation view of the fan illustrated in FIG. 7;

DETAILED DESCRIPTION OF THE PREFERRED EMBODIMENT

Figure 2:
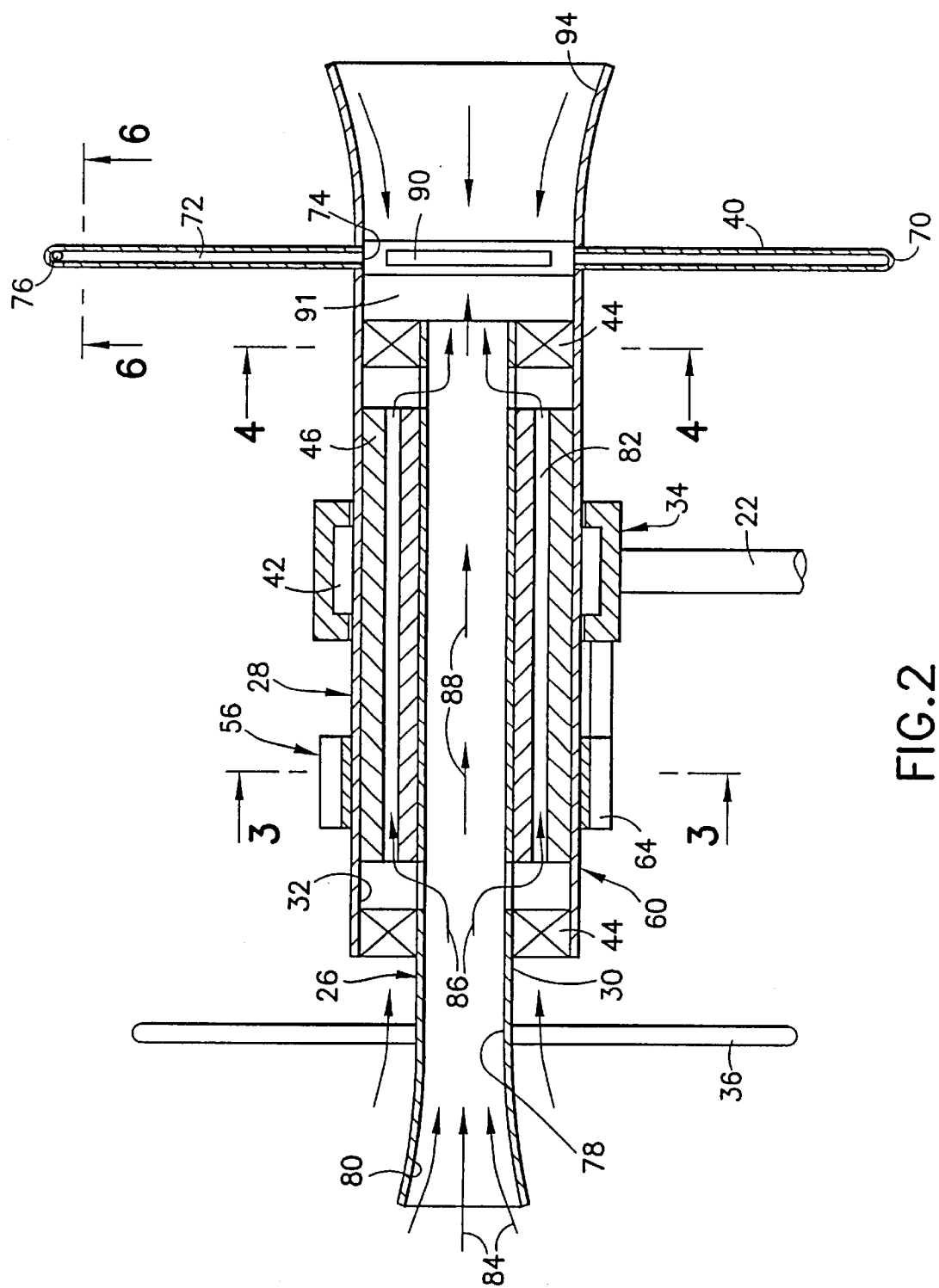
FIG. 2 is a longitudinal cross section view of a hub assembly depicting in greater detail the operational components of the wind turbine system of the invention.

Referring to FIG. 1, there is shown a perspective view of a wind turbine system 20 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

In FIG. 1, the wind turbine system 20 is seen to include an upright mast 22 supporting a hub assembly 24 including inner and outer coaxial shafts 26, 28, respectively. As better seen in FIG. 2, the inner shaft 26 has an outer peripheral surface 30 and the outer shaft 28 has an inner peripheral surface 32 spaced from the surface 30. A support bearing 34 on the upright mast 22 underlies the hub assembly 24 and rotatably supports the hub assembly. With this construction, the hub assembly 24 may be selectively positioned in azimuth so that a first set of rotor blades 36 are relatively closer to wind-induced air flow, represented by an arrow 38, or windward, and a second set of rotor blades 40 are relatively farther from the wind-induced air flow, or leeward.

Figure 4:
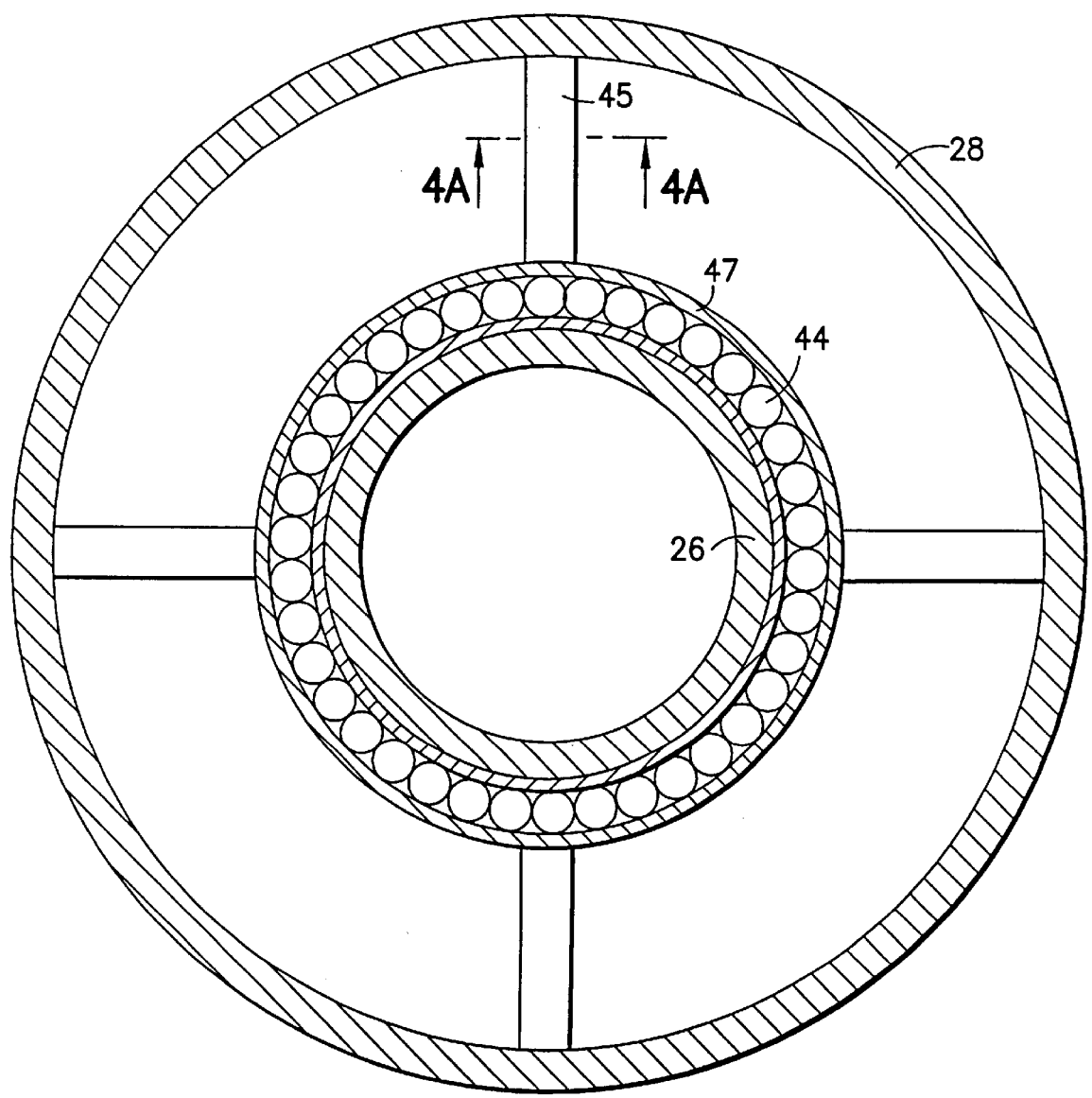
FIG. 4 is a cross section view taken generally along line 4—4 in FIG. 2.

A suitable first bearing 42, sustained on the support bearing 34 at the upper regions of the upright mast 22, supports the outer shaft 28 for rotation about a generally horizontal axis and a pair of longitudinally spaced second bearings 44 (see FIGS. 2 and 4) support the inner shaft 26 on the outer shaft 28 for rotation about the same axis of rotation as that about which the outer shaft rotates. It may be desirable in one possible configuration for structural, yet aerodynamically shaped pylons 45 (FIGS. 4 and 4A), to interconnect an outer race 47 of each bearing 44 with the shaft 28.

Figure 3:
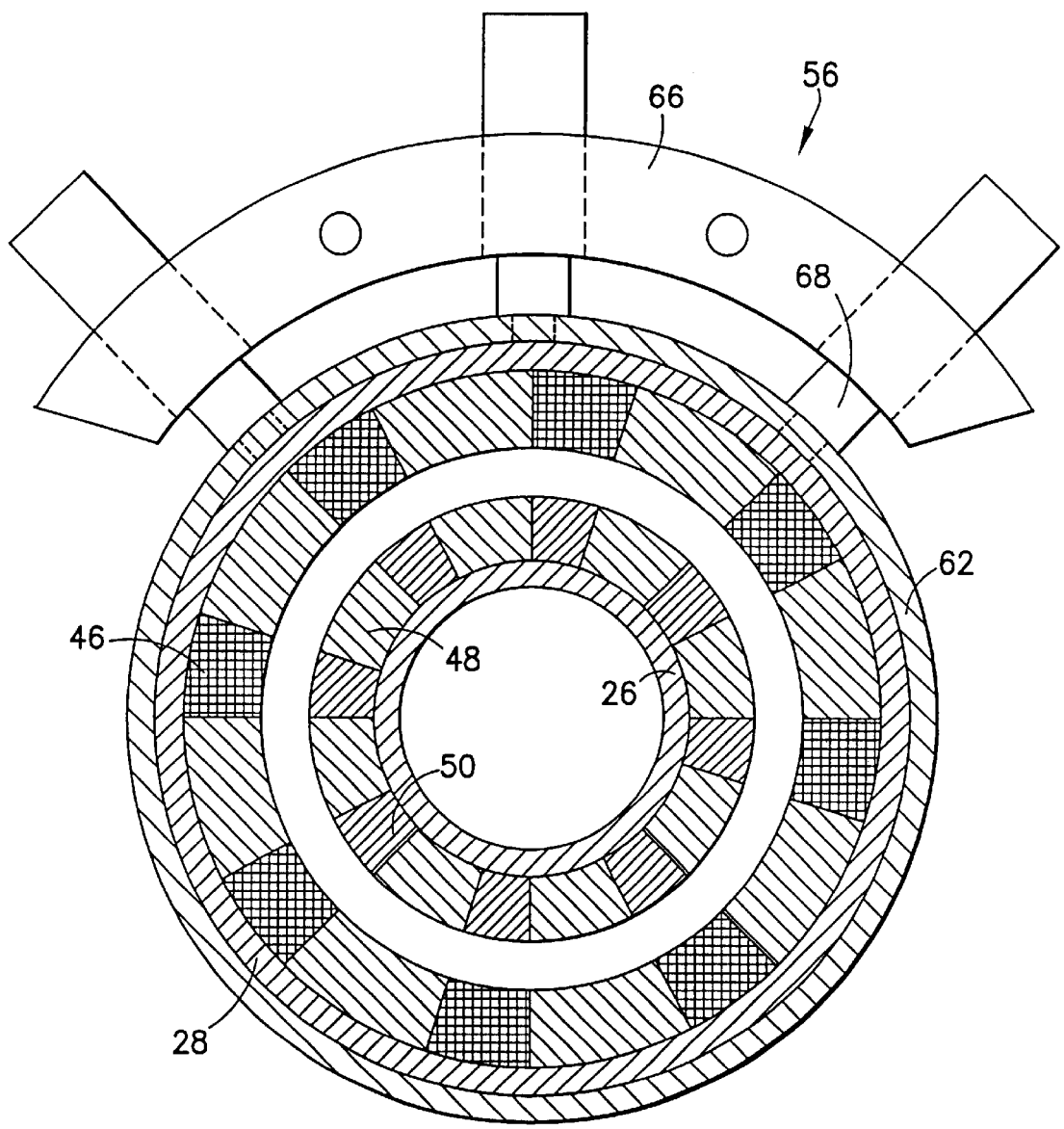
FIG. 3 is a cross section view taken generally along line 3—3 in FIG. 2.

In a known manner, an armature winding, or plurality of windings, 46 is provided on the outer shaft 28. A plurality of magnets 48 (FIG. 3) are suitably mounted on the inner shaft 26 at a plurality of circumferentially spaced locations, each adjacent pair of the magnets being separated by a dielectric spacer 50.

The first set of rotor blades 36 is mounted on the inner shaft 26. The rotor blades 36 extend radially away from the axis of rotation at a plurality of circumferentially spaced locations and, are so positioned on the inner shaft in angularity with respect to the wind-induced air flow 38 that they rotate the inner shaft in a first direction represented by an arrow 52 about the axis of rotation when subjected to the wind-induced air flow. The second set of rotor blades 40 is similarly mounted on the outer shaft 28. The rotor blades 40 are axially spaced from the first set of rotor blades 36 and extend radially away from the axis of rotation at a plurality of circumferentially spaced locations. The second set of rotor blades 40 are so positioned on the outer shaft 28 in angularity with respect to the wind-induced air flow 38 that they rotate the outer shaft about the axis of rotation in a second direction represented by an arrow 54. When subjected to wind-induced air flow, the blades 40 and the outer shaft 28 of which they are an integral part rotate in a direction which is opposite that indicated by the arrow 52.

By reason of the armature winding 46 on the outer shaft 28 and the plurality of magnets 48 on the inner shaft 26 rotating in opposite directions, electrical power is thereby generated in the known manner. Power transfer apparatus 56 (see FIGS. 2 and 3) is employed for drawing off the electrical power as it is generated from the hub assembly 24 to a distant receiver 58 which may be within the upright mast 22, and beyond. As seen in FIGS. 2–5, the outer shaft 28 has an outer peripheral surface 60 and a plurality of circumferential electrically conductive slip rings 62 are positioned at a plurality of parallel longitudinally spaced locations on the outer peripheral surface. Viewing especially FIG. 3, the power transfer apparatus 56 includes a plurality of brush holders 66 and a support 64 mounted on the bearing assembly 34. In turn, a plurality of annular brush holders 66 are mounted on the brush holder support 64 and a plurality of sets of brushes 68 supported on the brush holder slidably engage with the slip rings 62, each set of the brushes being engaged with an associated one of the slip rings.

Each of the leeward rotor blades 40 extends radially away from the outer shaft 28 to a tip end 70 and has a radial passage 72 (FIGS. 2 and 6) extending from an inlet 74 at the inner peripheral surface 32 of the outer shaft 28 to a tangentially directed outlet 76 at the tip end. Preferably, the diameter of the leeward rotor blades 40 is greater than the diameter of the windward rotor blades 36 so that the leeward rotor extracts extra energy from the undisturbed free stream at no additional cost. Furthermore, the inner shaft 26 is hollow, defining an axially extending duct 78 with a windward inlet nozzle 80 for receiving the wind-induced air. The spacing between the inner shaft 26 and the outer shaft 28 defines an annular passage 82 of uniform dimension. The construction just described permits the air to flow into the inlet nozzle 80 (see arrows 84), through the annular passage 82 (see arrows 86) and through the longitudinally extending duct (see arrows 88).

In a region of the hub assembly 24 generally coextensive with the leeward rotor blades 40, a fan 90 is rotatably mounted in a suitable manner on the outer shaft 28 and within a compartment 91 defined by the inner peripheral surface 32 for receiving the air from the annular passage 82 and from the axially extending duct 78. By reason of blades 92 on the fan 90 (see FIGS. 7 and 8), the air advancing from the axial duct 78 and from the annular passage 82 is redirected for flow through the inlet 74 to the radial passage 72 of each of the leeward rotor blades 40.

At the leeward end of the hub assembly, 24, a leeward inlet nozzle 94 is provided integral with the outer shaft 28 for receiving air from the general region of the leeward inlet nozzle. The fan 90 is preferably double-sided so that it includes the plurality of windward impeller blades 92 facing the windward inlet nozzle 80 for receiving the air from the annular passage 82 and from the axially extending duct 78 and redirecting the air for flow through the inlet 74 to the radial passage 72 of each of the leeward rotor blades 40 and so that it includes a plurality of similar leeward impeller blades 96 facing the leeward inlet nozzle 94 for receiving air from that region of the hub assembly 24, then redirecting that air for flow through the inlet 74 to the radial passage of each of the leeward rotor blades.

Figure 9:
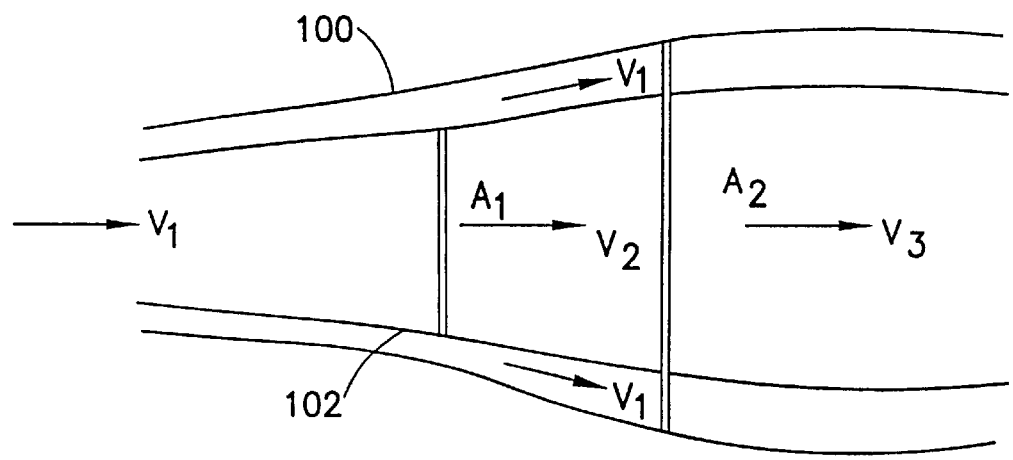
FIG. 9 is a diagrammatic representation of Betz's disk analogy.

Let us now consider the theoretical aspects of the invention. To this end, consider the two-rotor configuration shown in FIG. 9. Two stream tubes 100, 102 are shown to represent Betz's disk analogy. The leeward rotor is assumed to be slightly bigger so that it intercepts the free stream. The power in these two disks, considering the influence of the turbofan, may be written as, $$P = \frac{1}{2}\rho A_1 \left(\frac{V_1 + V_2}{2}\right)(V_1^2 - V_2^2) + \qquad (1)$$

$$\frac{1}{2}\rho A_2 \left(\frac{V_1 + V_2 + 2V_3}{4}\right)\left(\left(\frac{V_1 + V_2}{2}\right)^2 + V_3^2\right) - P_{inletair} + P_{wake}$$

where $A_1$, and $A_2$ are the rotor disk areas, $V_1$, $V_2$, $V_3$ are the mean velocities in each zone. $P_{inletair}$ is the power generated by the countervailing air jets. The net energy in the air jet comprises of kinetic energy, thermal energy resulting from copper and iron losses, and the potential head arising from the centrifugal forces. $P_{wake}$ is the power enhancement due to rotor aerodynamic efficiency improvement resulting from the removal of wake/air-blockage. For maximum power the down stream velocities, $V_2$, $V_3$, can be written as, $$V_2 = \kappa_1 V_1 \quad (2)$$

$$V_3 = \kappa_2 V_1 \quad (3)$$

$$\text{in which, } \kappa_1 = \frac{9 + 4(A_2/A_1)}{23} \quad (4)$$

$$\text{and } \kappa_2 = \frac{1 + \kappa_1}{6} \quad (5)$$

Then, the power factor of the counter rotating system is given by $$C_P = \left[\frac{1}{2}(1-\kappa_1) + \frac{2}{27}\left(\frac{A_2}{A_1}\right)(1+\kappa_1)\right](1+\kappa_1)^2 \quad (6)$$

As an example, consider leeward rotor area $A_2 = 1.2 A_1$, then $\kappa_1 = 0.6$, $\kappa_2 = 0.2666$. The corresponding power factor is $C_P = 0.8766$. This suggests that a counter rotating turbine system can extract 48% more power than a corresponding single rotor system. Thus, the cost of energy to consumers can be reduced by 33%. Additional reduction in cost to the consumer will also result from two more innovations that will be discussed next.

Figure 10:
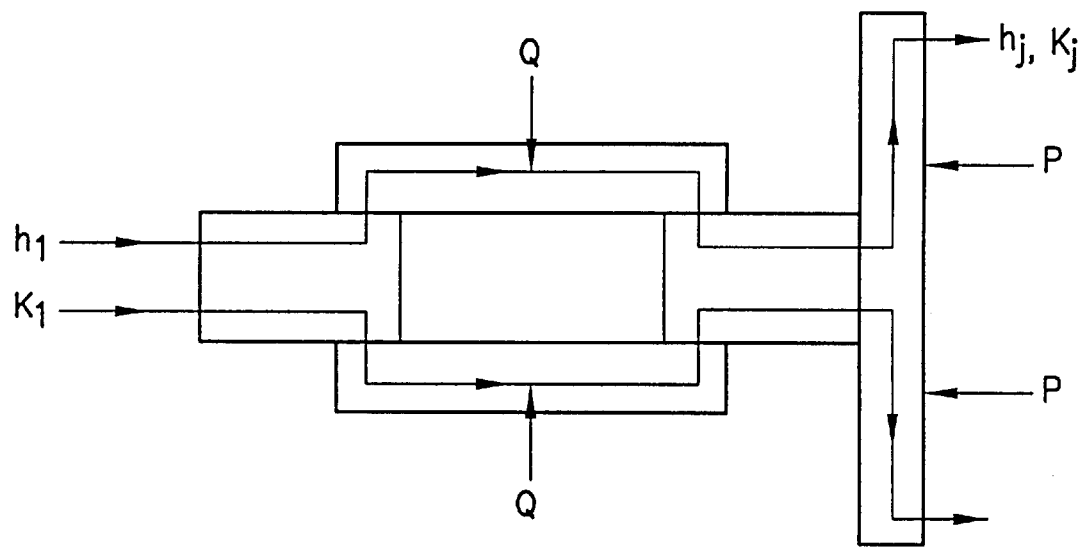
FIG. 10 is an energy balance diagram representative of the operation of the invention.

Now, as shown in FIG. 10, a certain mass of air enters the inlet and passes through the alternator and the leeward rotor blades. In this process, the air extracts a certain amount of heat Q that was generated in the alternator as a result of iron and copper losses. It also gains potential energy P, due to the centrifugal effect while passing through the rotor blades. Thus, the kinetic energy $K_1$ of the inlet air, the thermal energy Q, and the potential energy P will be transformed into an air jet impulse to assist the leeward rotor. FIG. 10 shows an energy balance diagram of this process.

The energy equation for a unit mass of air, referring to FIG. 10, can be written as, $$h_1 + K_1 + Q + P = h_j + K_j \text{ in Btu/lb} \quad (7)$$

where, h is the enthalpy, $$K = \frac{V^2}{2g_0 J}$$

is the kinetic energy (ram), Q is heat addition from the alternator, and $$P = \frac{(\Omega R)^2}{6g_0 J}$$

is the potential energy (centrifugal head) of the column of air in the leeward blade due to the centripetal acceleration. $A_b$ is the cross sectional area of the air passage in the blade, $\Omega$ is the angular velocity of the blade, and R is the tip radius of the blade. The subscript 1 denotes the free stream condition, while j denotes the air jet at the blade tip. The air jet velocity $V_j$ can be determined using the conservation of mass and the laws of gas properties. Finally, the corresponding increments in torque and power $P_{inletair}$ can be calculated. This device is expected to increase the efficiency by at least by 10 to 15%.

Power enhancement can be achieved by pumping a certain mass of air from the wake or the low energy region behind the second rotor. Here, a double side turbofan will be used to pump air taken from the wake as well as from the inlet. Theoretical analysis shows recovery of another 5% of energy.

From all of the foregoing, consider some of the advantages of the proposed wind turbine system over the known single rotor system:

1. these innovations disclosed are expected to increase the energy conversion efficiency by 80 to 90 per cent compared to the conventional wind turbines of similar rotor disk area;
2. the counter rotating disk concept helps to reduce rotor angular velocity while maintaining higher magnetic flux rate; consequently, drag losses will be reduced;
3. higher energy conversion efficiency leads to a light weight turbine system, easy to install and maintain, with reduced acquisition cost and energy cost;
4. reduced starting torque requirements permit installations of renewable energy units embodying the invention for irrigation, schools, hospitals and hotels even in low wind speed regions.

Wind energy is environmentally safe and is an inexhaustible source. The proposed wind turbine system is on the order of 80% more efficient than its known counterparts and is operable in low wind speed regions. Thus, more geographic regions can be serviced by this wind energy project. The ownership cost of these units is expected to be about half that of comparable units presently on the market.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Wind turbine apparatus comprising:
    a hub assembly including inner and outer coaxial shafts, the inner shaft having an outer peripheral surface, the outer shaft having an inner peripheral surface spaced from the outer peripheral surface of the inner shaft;
    first bearing means supporting the outer shaft for rotation about a generally horizontal axis;
    second bearing means supporting the inner shaft on the outer shaft for rotation about the axis of rotation;
    an armature winding on the outer shaft;
    a plurality of magnets on the inner shaft at a plurality of circumferentially spaced locations, each adjacent pair of the magnets being separated with a dielectric spacer;
    a first set of rotor blades mounted on the inner shaft at a plurality of circumferentially spaced locations and extending radially away from the axis of rotation, the first set of rotor blades positioned on the inner shaft for rotating the inner shaft in a first direction about the axis of rotation when subjected to wind-induced air flow;
    a second set of rotor blades mounted on the outer shaft axially spaced from the first set of rotor blades at a plurality of circumferentially spaced locations and extending radially away from the axis of rotation, the second set of rotor blades positioned on the outer shaft for rotating the outer shaft about the axis of rotation in a second direction opposite the first direction when subjected to wind-induced air flow;
    thereby generating electrical power as the armature winding on the outer shaft and the plurality of magnets on the inner shaft rotate in opposite directions.

2. Wind turbine apparatus as set forth in claim 1 including:
  an upright mast; and
  support bearings on the upright mast underlying the hub assembly for rotatably supporting the hub assembly enabling it to be selectively positioned in azimuth so that the first set of rotor blades are relatively closer to the wind-induced air flow, or windward, and the second set of rotor blades are relatively farther from the wind-induced air flow, or leeward.

3. Wind turbine apparatus as set forth in claim 2 including:
  power transfer means for drawing off the electrical power from the hub assembly to a distant receiver.

4. Wind turbine apparatus as set forth in claim 3
  wherein the outer shaft has an outer peripheral surface and a plurality of circumferential electrically conductive slip rings positioned at a plurality of parallel longitudinally spaced locations thereon; and
  wherein the power transfer means includes:
  a brush holder support mounted on the upright mast;
  an annular brush holder mounted on the brush holder support; and
  a plurality of sets of brushes supported on the brush holder slidably engaged with the slip rings, each set of brushes engaged with an associated one of the slip rings.

5. Wind turbine apparatus as set forth in claim 1
  wherein each of the leeward rotor blades extends from the outer shaft to a tip end and has a radial passage extending from an inlet at the inner peripheral surface of the outer shaft to a tangentially directed outlet at the tip end;
  wherein the spacing between the inner shaft and the outer shaft defines an annular passage of uniform dimension; and
  wherein the inner shaft is hollow and defines an axially extending duct; and including:
  a windward inlet nozzle for receiving wind-induced air and permitting the air to flow through the annular passage and through the longitudinally extending duct; and
  a fan for receiving the air from the annular passage and from the axially extending duct and redirecting the air for flow through the inlet to the radial passage of each of the leeward rotor blades.

6. Wind turbine apparatus as set forth in claim 5 including:
  a leeward inlet nozzle integral with the outer shaft for receiving air at the leeward end of the hub assembly; and
  wherein the fan is double-sided including a plurality of windward impeller blades facing the windward inlet nozzle for receiving the air from the annular passage and from the axially extending duct and redirecting the air for flow through the inlet to the radial passage of each of the leeward rotor blades and a plurality of leeward impeller blades facing the leeward inlet nozzle for receiving air from the leeward inlet nozzle and redirecting the air for flow through the inlet to the radial passage of each of the leeward rotor blades.

7. Wind turbine apparatus as set forth in claim 5
  wherein the diameter of the set of leeward rotor blades is greater than the diameter of the set of windward rotor blades.

8. Wind turbine apparatus comprising:
  a hub assembly including inner and outer coaxial shafts, the inner shaft having an outer peripheral surface, the outer shaft having an inner peripheral surface spaced from the outer peripheral surface of the inner shaft;
  first bearing means supporting the outer shaft for rotation about a generally horizontal axis;
  second bearing means supporting the inner shaft on the outer shaft for rotation about the axis of rotation;
  a first set of rotor blades mounted on the inner shaft at a plurality of circumferentially spaced locations and extending radially away from the axis of rotation, the first set of rotor blades positioned on the inner shaft for rotating the inner shaft in a first direction about the axis of rotation when subjected to wind-induced air flow; and
  a second set of rotor blades mounted on the outer shaft axially spaced from the first set of rotor blades at a plurality of circumferentially spaced locations and extending radially away from the axis of rotation, the second set of rotor blades positioned on the outer shaft for rotating the outer shaft about the axis of rotation in a second direction opposite the first direction when subjected to wind-induced air flow.

9. Wind turbine apparatus as set forth in claim 8 including:
  an upright mast; and
  support bearings on the upright mast underlying the hub assembly for rotatably supporting the hub assembly enabling it to be selectively positioned in azimuth so that the first set of rotor blades are relatively closer to the wind-induced air flow, or windward, and the second set of rotor blades are relatively farther from the wind-induced air flow, or leeward.

10. Wind turbine apparatus as set forth in claim 9 including:
  power transfer means for drawing off the electrical power from the hub assembly to a distant receiver.

11. Wind turbine apparatus as set forth in claim 10
  wherein the outer shaft has an outer peripheral surface and a plurality of circumferential electrically conductive slip rings positioned at a plurality of parallel longitudinally spaced locations thereon; and
  wherein the power transfer means includes:
  a brush holder support mounted on the upright mast;
  an annular brush holder mounted on the brush holder support; and
  a plurality of sets of brushes supported on the brush holder slidably engaged with the slip rings, each set of brushes engaged with an associated one of the slip rings.

12. Wind turbine apparatus as set forth in claim 8
  wherein each of the leeward rotor blades extends from the outer shaft to a tip end and has a radial passage extending from an inlet at the inner peripheral surface of the outer shaft to a tangentially directed outlet at the tip end;
  wherein the spacing between the inner shaft and the outer shaft defines an annular passage of uniform dimension; and
  wherein the inner shaft is hollow and defines an axially extending duct; and including:
  a windward inlet nozzle for receiving wind-induced air and permitting the air to flow through the annular passage and through the longitudinally extending duct; and a fan for receiving the air from the annular passage and from the axially extending duct and redirecting the air for flow through the inlet to the radial passage of each of the leeward rotor blades.

13. A method of generating power comprising the steps of:

(a) providing a hub assembly including inner and outer coaxial shafts, the inner shaft having an outer peripheral surface, the outer shaft having an inner peripheral surface spaced from the outer peripheral surface of the inner shaft;

(b) mounting a first set of rotor blades on the inner shaft at a plurality of circumferentially spaced locations so as to extend radially away from the axis of rotation;

(c) mounting a second set of rotor blades on the outer shaft axially spaced from the first set of rotor blades at a plurality of circumferentially spaced locations so as to extend radially away from the axis of rotation; and (d) positioning the first and second sets of rotor blades so that wind-induced air flow causes the first set of blades to rotate with the inner shaft in a first direction and so that wind-induced air flow causes the second set of blades to rotate with the outer shaft in a second direction opposite the first direction.

14. A method of generating power as set forth in claim 13 including the steps of:

(e) providing an armature winding on the outer shaft;

(f) providing a plurality of magnets on the inner shaft at a plurality of circumferentially spaced locations;

(g) separating each adjacent pair of the magnets with a dielectric spacer thereby generating electrical power as the armature winding on the outer shaft and the plurality of magnets on the inner shaft rotate in opposite directions.

15. A method of generating power as set forth in claim 14 including the steps of:

(h) providing each of the leeward rotor blades with a radial passage extending from an inlet at the inner peripheral surface of the outer shaft to a tangentially directed outlet at the tip end;

(i) providing an annular passage of uniform dimension between the inner shaft and the outer shaft; and (j) providing an axially extending duct through the inner shaft; and (k) receiving wind-induced air through a windward inlet nozzle and permitting the air to flow through the annular passage and through the longitudinally extending duct and redirecting the air for flow through the inlet to the radial passage of each of the leeward rotor blades.

16. A method of generating power as set forth in claim 15 including the step of:

(l) receiving air at the leeward end of the hub assembly and redirecting the air for flow through the inlet to the radial passage of each of the leeward rotor blades.

17. A method of generating power as set forth in claim 14 including the step of:

(h) drawing off the electrical power from the hub assembly to a distant receiver.

* * * * *